United States Patent [19]

Tanaka

[11] Patent Number: 5,513,385

[45] Date of Patent: Apr. 30, 1996

[54] RECEPTION APPARATUS, SIGNAL REPRODUCING APPARATUS USING RECEPTION APPARATUS AND CONTROL METHOD THEREOF

[75] Inventor: Yozo Tanaka, Kanagawa, Japan

[73] Assignee: Sony Corporation, Tokyo, Japan

[21] Appl. No.: 314,081

[22] Filed: Sep. 28, 1994

[30] Foreign Application Priority Data

Sep. 30, 1993 [JP] Japan .................................. 5-245453

[51] Int. Cl.⁶ ................................................. H04B 1/16
[52] U.S. Cl. ........................................ 455/228; 455/343
[58] Field of Search ......................... 381/2, 3, 4; 455/45,
455/58.1, 227, 228, 343; 370/76

[56] References Cited

U.S. PATENT DOCUMENTS

| | | | |
|---|---|---|---|
| 4,435,843 | 3/1984 | Eilers et al. | 455/226 |
| 4,450,589 | 5/1984 | Eilers et al. | 455/228 |
| 5,060,300 | 10/1991 | Luber et al. | 455/228 |
| 5,276,909 | 1/1994 | Milner et al. | 455/228 |
| 5,394,562 | 2/1995 | Spelter et al. | 455/343 |

FOREIGN PATENT DOCUMENTS

| | | |
|---|---|---|
| 0386835A1 | 9/1990 | European Pat. Off. . |
| 4034521A1 | 5/1991 | Germany . |
| 3820639A1 | 12/1989 | Netherlands . |

*Primary Examiner*—Benedict V. Safourek
*Attorney, Agent, or Firm*—Limbach & Limbach

[57] ABSTRACT

A radio receiver continues to demodulate a broadcast signal that was modulated with a baseband signal and a data signal to obtain the data signal after the receiver circuitry unassociated with extracting the data signal has been deenergized when the receiver is set in a predetermined mode. As described, the baseband signal has a program content, while the data signal identifies the program content of the baseband signal. In accordance with the present invention, the unassociated receiver circuitry is reenergized to output an amplified baseband signal capable of driving a speaker when the program content of the data signal indicates that a preselected program is starting, and again deenergizes the unassociated receiver circuitry when the program content of the data signal indicates that the preselected program is over.

10 Claims, 3 Drawing Sheets

RECEPTION APPARATUS, SIGNAL REPRODUCING APPARATUS USING RECEPTION APPARATUS AND CONTROL METHOD THEREOF

BACKGROUND

1. Field of the Invention

The present invention relates to a reception apparatus, a signal reproducing apparatus using the reception apparatus and a control method thereof. More particularly, this invention relates to a reception apparatus for receiving data multiplex broadcasting, a signal reproducing apparatus using the reception apparatus and a control method thereof.

2. Background of the Invention

In European countries, FM audio broadcast service is initiated to broadcast an audio signal in the form of a broadcast signal added with data concerning broadcast contents. This broadcasting service that just started in European countries is called a Radio Data System (RDS). FM broadcasting based on the RDS (hereinafter simply referred to as "RDS broadcast") will be described below.

As shown in FIG. 1 of the accompanying drawings, a baseband signal of an FM broadcast signal is transmitted in the multiplexed form of a main signal M (sum signal L+R in the case of stereo broadcasting) and a stereo signal S (difference signal L-R), and a stereo pilot signal P is assigned to a frequency band of 19 kHz. This is the same as the ordinary FM stereo broadcast signal.

In the case of the RDS broadcast, a sub-carrier signal SC is assigned to a frequency band of 57 kHz which is three times as high as the frequency of the stereo pilot signal P. RDS data R is modulated by the sub-carrier signal SC.

The RDS data R is composed of grouped digital data as shown in FIG. 2. As shown in FIG. 2, one group is composed of 4 blocks and each block is composed of 26-bit data. Of 26 bits, 16 bits are assigned to practical data representing broadcast contents or the like, and remaining 10 bits are assigned to an error correction code. The 16-bit data in respective blocks are defined individually.

Data transmitted according to the above-mentioned format are mainly as follows:

PS code . . . Character data representing broadcast station name

PI code . . . ID (identification) code of broadcast program, country name code, program code, etc.

TP code . . . Traffic information broadcast station ID signal

TA code . . . Traffic information broadcasting ID signal

PTY code . . . Program content ID code representing contents of news, sports and music of each genre EON code . . . ID code representing broadcast contents of other broadcast station The listener can learn the present broadcast contents of a certain broadcast station by using these codes and also can learn broadcast contents of other broadcast station. By using the TP code representing that the traffic information broadcasting is carried out, for example, it is possible to for the listener detect that traffic information is broadcast by a broadcasting station (its own or other broadcasting station) represented by other data (PS code, EON code, etc.) transmitted simultaneously.

Accordingly, it is possible to determine by identifying the RDS data superimposed upon the broadcasting signal of this broadcasting station when the listener listens to FM broadcasting of a certain frequency, for example, whether or not other broadcasting station broadcasts traffic information. Therefore, it is possible to prevent the listener from missing desired information, such as traffic information or the like. of the listener.

When the data based on the RDS broadcasting is used as described above, it is necessary for the listener to constantly listen to FM broadcasting (RDS broadcasting) of any broadcasting station. If the FM broadcasting or RDS broadcasting were not received, RDS data would not be received. For this reason, unless traffic information is broadcast by any broadcasting station for a long period of time when the listener wishes to hear traffic information, for example, the listener should keep listening to broadcasting of other broadcasting content for a long period of time until any broadcasting station starts broadcasting traffic information.

In this case, if no sounds are inhibited from being emanated from the speakers of the receiver by adjusting the volume control under the condition that an FM receiver receives the RDS broadcasting, it is possible for the listener to obtain only the RDS data without listening to broadcast sounds. In this case, however, although the listener learns that any broadcasting station broadcasts broadcasting program of desired contents based on the RDS data, such as traffic information, new or the like, it is not possible for the listener to listen to such broadcasting without operating the volume control. There is then the large possibility that the listener will miss the chance of hearing such desired information while operating the volume control.

SUMMARY OF THE INVENTION

It is, therefore, an object of the present invention to provide a signal reproducing apparatus in which the above-mentioned problems can be solved.

It is another object of the present invention to provide a reception apparatus in which the above-mentioned problems can be solved.

It is a further object of the present invention to provide a control method of controlling a signal reproducing apparatus in which the above-mentioned problems can be solved.

According to the present invention, there is provided a signal reproducing apparatus for receiving a broadcasting signal transmitted in the form of a multiplex signal added with data concerning classification of broadcasting content. The signal reproducing apparatus includes a demodulating unit, a signal processing unit, an identification unit and a control unit. The demodulating unit demodulates a received broadcasting signal and also demodulates data concerning classification of broadcasting content contained in the received broadcasting signal. The signal processing unit is supplied with an output signal from the demodulating unit and processes and outputs the output signal supplied thereto in a predetermined signal processing fashion. The identification unit is supplied with demodulated data from the demodulating unit and identifies the demodulated data supplied thereto. The control unit controls the supply of power to the demodulating unit, the signal processing unit and the identification unit. The control unit energizes the demodulating unit and the identification unit when the power switch of the apparatus is turned off under the condition that a mode for receiving broadcasting of a predetermined broadcasting classification represented by the data concerning the broadcasting content is set. Also, when the identified result from the identification unit shows that the broadcasting of the predetermined broadcasting classification is carried out, the control unit generates a control signal which effect the channel selection based on the identified result from the identification unit and energizes the signal processing unit.

According to the present invention, there is provided a reception apparatus for receiving a broadcasting signal transmitted in the form of a multiplex signal added with data concerning classification of broadcasting content. The reception apparatus includes a reception unit, a demodulating unit, a data demodulating unit and a control unit. The reception unit receives a broadcasting signal transmitted thereto. The demodulating unit demodulates an output signal supplied thereto from the reception unit. The data demodulating unit demodulates data concerning classification of broadcasting content contained in the output signal from the reception unit. The control unit is supplied with the demodulated data from the data demodulating unit and identifies the demodulated data supplied thereto. In this apparatus, the reception unit, the data demodulating unit and the control unit are energized when the power switch of the apparatus is turned off under the condition that a mode for receiving broadcasting of a predetermined broadcasting classification represented by the data concerning the broadcasting content is set. Also, under this state, when it is detected by the control unit that the broadcasting of the predetermined broadcasting classification is carried out, the control unit generates a detected signal representing that the broadcasting of the predetermined broadcasting classification is carried out and the reception unit carries out channel selection operation.

According to the present invention, there is provided a control method of a signal reproducing apparatus including a reception unit and a signal processing unit. The reception unit receives a broadcasting signal transmitted in the form of a multiplex signal added with data concerning classification of broadcasting content. The reception unit includes a demodulating unit for demodulating a received broadcasting signal and the data concerning classification of broadcasting content contained in the received broadcasting signal and an identification unit for identifying demodulated data supplied thereto. The signal processing unit is supplied with an output signal from the demodulating unit. According to the control method, when the power switch of the apparatus is turned off under the condition that a mode for receiving the broadcasting of the predetermined classification represented by the broadcasting content is set, the reception unit is constantly energized. Under this condition, if the identified result of the identification unit shows that the broadcasting of the predetermined broadcasting classification is carried out, then the reception unit carries out channel selection based on the identified result of the identification unit and the signal processing unit is energized.

According to the present invention, even under the condition that the power switch of the reception unit, the reception apparatus or the signal reproducing apparatus is turned off, if the transmission of the broadcasting signal added with the data concerning the classification of the previously-set broadcasting content is started, it is possible to receive and automatically reproduce the broadcasting signal transmitted in the form of the multiplex signal added with the data concerning the classification of the broadcasting content that is started being broadcast by carrying out predetermined setting.

DESCRIPTION OF THE INVENTION

A signal reproducing apparatus according to an embodiment of the present invention will hereinafter be described in detail with reference to the drawings.

The signal reproducing apparatus according to this embodiment is applied to the FM reception apparatus for receiving the aforementioned RDS broadcasting.

Figure 3:
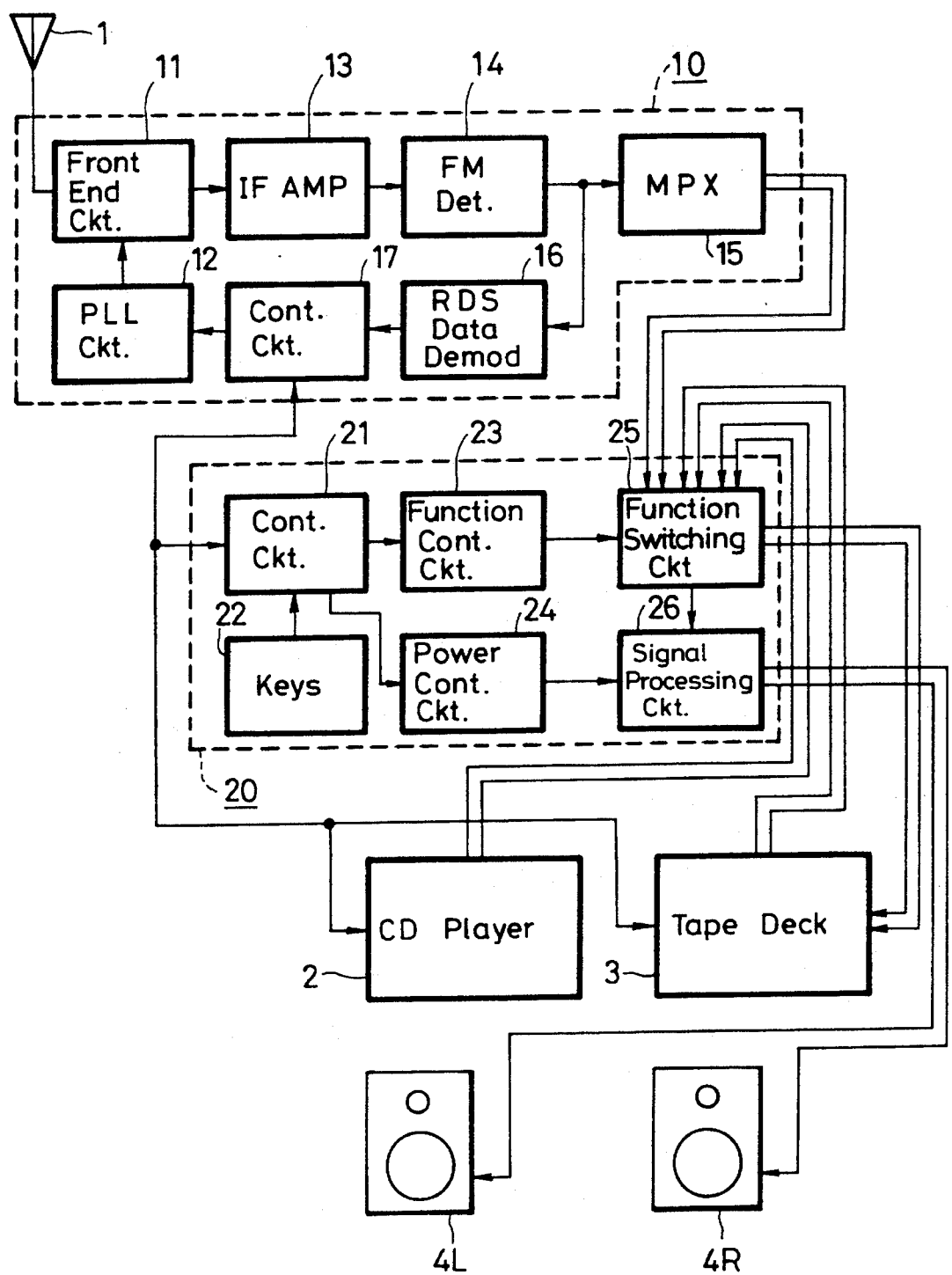
FIG. 3 is a schematic block diagram showing an arrangement of a system stereo according to an embodiment of the present invention.

As shown in FIG. 3, this FM reception apparatus is generally formed as a system stereo apparatus. Specifically, as shown in FIG. 3, the system stereo apparatus comprises a tuner 10, an amplifying apparatus 20, a CD (compact disc) player 2, a tape deck 3 and left and right speakers 4L and 4R. The FM radio broadcasting such as the RDS broadcasting or the like can be received by the tuner 10.

A circuit arrangement of the tuner 10 will be described below. As shown in FIG. 3, a signal received at an FM antenna 1 is supplied to a front end circuit 11 provided within the tuner 10. The front end circuit 11 is supplied with a channel selection frequency signal from a PLL (phase-locked loop) circuit 12. Then, the front end circuit 11 mixes the channel selection frequency signal to an input signal supplied thereto from the FM antenna 1 to provide an intermediate frequency (IF) signal of a broadcast wave with a predetermined frequency.

The intermediate frequency signal from the front end circuit 11 is supplied through an intermediate frequency amplifying (IF AMP) circuit 13 to an FM detecting (FM DET) circuit 14 and is thereby detected. A detected signal from the FM detector 14 is supplied to a multiplexer (MPX) 15 which demodulates the detected signal supplied thereto to provide left and right stereo signals. The left and right stereo signals are supplied to a function switching circuit 25 provided within the amplifying apparatus 20. The detected signal output from the FM detecting circuit 14 is also supplied to an RDS data demodulating (RDS DATA DEMOD) circuit 16.

Figure 1:
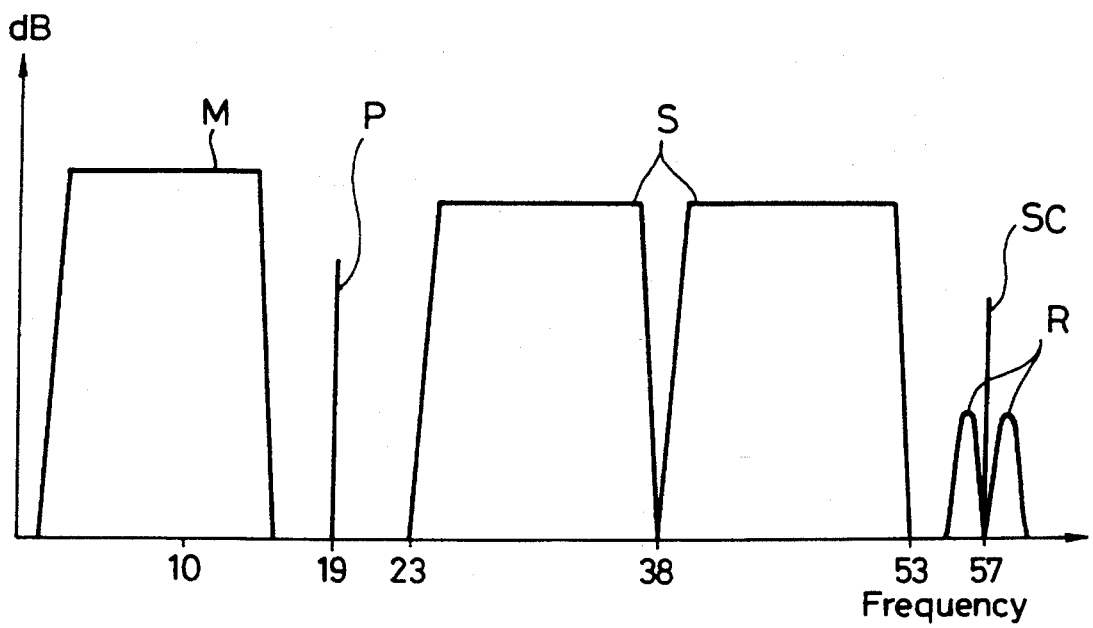
FIG. 1 is an explanatory diagram showing frequency spectrums of signals used in the RDS broadcasting.
Figure 2:
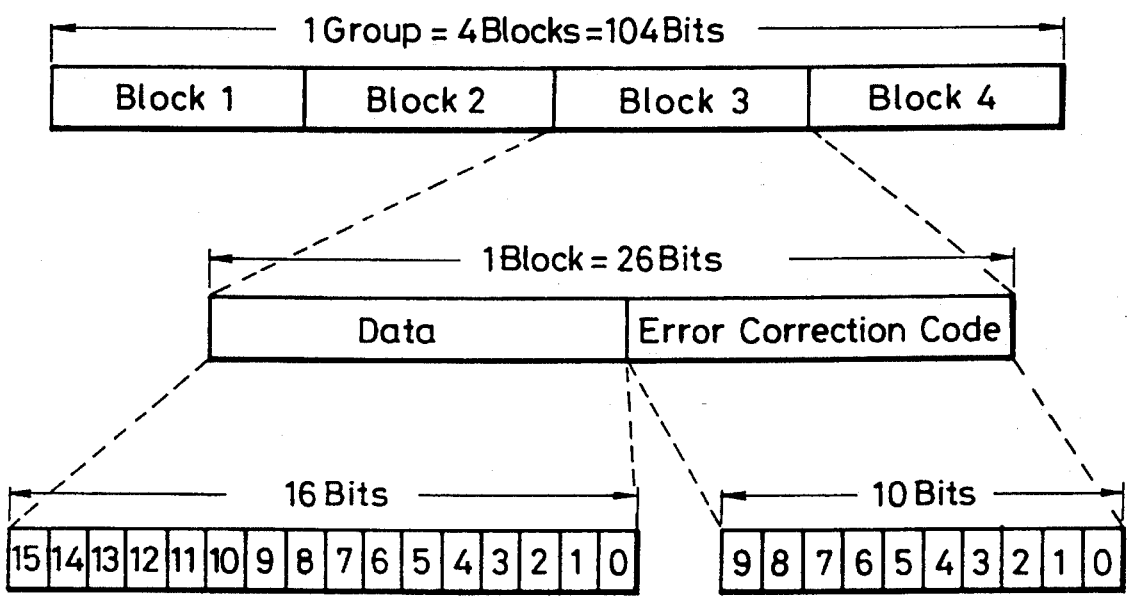
FIG. 2 is an explanatory diagram showing an example of a data format in the RDS broadcasting.

The RDS demodulating circuit 16 demodulates the RDS data which was modulated by the sub-carrier signals SC shown in FIG. 2, and supplies demodulated data to a control (CONT) circuit 17 formed of a microcomputer provided within the tuner 10. The control circuit 17 performs control operation concerning reception operation, such as control of a reception frequency, of the tuner 10. The control circuit 17 controls a frequency of the channel selection signal output from the PLL circuit 12 based on a control signal supplied thereto from the amplifying apparatus 20 to carry out a reception processing of FM broadcasting with a predetermined frequency. Further, the control circuit 17 identifies contents of data supplied thereto from the RDS data demodulating circuit 16 and supplies identified result to the amplifying apparatus 20. Depending on the set mode, the control circuit 17 automatically switches the reception frequency based on the identified data.

The amplifying apparatus 20 switches audio signals supplied thereto from the tuner 10, the CD player 2 and the tape deck 3, i.e., switches function modes, and processes the switched audio signal, such as amplifying the audio signal so that the audio signal can be output. Then, the amplifying apparatus 20 supplies the thus processed audio signal to the left and right speakers 4L, 4R. Specifically, the amplifying apparatus 20 includes a control (CONT) circuit 21 formed of a microcomputer. The control circuit 21 is connected with control circuits or controllers (each composed of a microcomputer) of other equipments, such as the tuner 10, the CD player 2 and the tape deck 3 via bus lines. The tuner 10, the CD player 2 and the tape deck 3 can be operated under the control of the control circuit 21. The control circuit 21 is connected with a plurality of keys 22 and information obtained when the key 22 is operated is supplied to the control circuit 21. The control circuit 21 controls operation of the circuit designated by the operation of the key 22 based on the information supplied thereto from the key 22. The listener can set various operation modes, such as an automatic channel selection mode or the like, which will be described later on, in addition to ordinary operation, such as to switch function modes, to switch reception frequencies at the tuner 10, to control volume and to energize and de-energize the whole system of the system stereo apparatus by using the keys 22.

In the case of the system stereo apparatus according to this embodiment, even when a power key (not shown) in the keys 22 is turned off, circuits necessary for executing the operation mode are maintained operable by the control signal supplied thereto from the control circuit 21 depending on the mode set at that time.

Under the control of the control circuit 21, the amplifying apparatus 20 is operated so that the function control circuit 23 switches input audio signals and a power control circuit 24 processes audio output signals.

The function switching circuit 25 switches input audio signals under the control of the function control circuit 23. Specifically, under the control of the function control circuit 23, the function switching circuit 25 switches and supplies the input audio signal to a signal processing circuit 26. Alternatively, the audio signal selected by the function switching circuit 25 can be directly supplied to the tape deck 3 and the tape deck 3 can record the audio signal supplied thereto. Furthermore, it is possible to select other input audio signals apart from the audio signal supplied to the tape deck 3 and the audio signal supplied to the signal processing circuit 26.

The signal processing circuit 26 receives the audio signal selected by the function switching circuit 25 and effects necessary audio signal output processing, such as amplifying or the like on the audio signal supplied thereto under the control of the power control circuit 24. In this case, the signal processing circuit 26 controls output volume based on volume control data supplied thereto from the control circuit 21 through the power control circuit 24.

The control circuit 21 according to this embodiment can perform various control operations based on the RDS data supplied thereto from the tuner 10 after the tuner 10 had received and identified the RDS data. Operation modes that are available in this embodiment are as follows:

(1) Mode (referred to hereinafter as "RDS forced channel selection mode") in which a channel selection frequency is switched to a channel selection frequency of a corresponding broadcasting station if it is determined by the RDS data contained in the received broadcast waves that other broadcast station starts broadcasting broadcast contents (traffic information, news, etc.) registered when the mode is set while the FM broadcasting audio signal received by the tuner 10 is output;

(2) Mode (referred to hereinafter as "RDS forced function switching mode") in which functions are switched by the amplifying apparatus 20 such that the FM broadcasting audio signal of the corresponding station is received by the tuner 10 and that the FM broadcasting audio signal thus received is emanated from speakers 4L, 4R as sounds if it is determined by receiving the RDS broadcasting signal by the tuner 10 that any one of broadcast stations starts broadcasting previously-registered broadcast contents when other audio signals (reproduced audio signals from the CD player 2 and the tape deck 3, etc.) than the FM broadcasting audio signal are output;

(3) Mode (referred to hereinafter as "RDS forced power on mode") in which the FM broadcasting audio signal of the corresponding broadcasting station is received by the tuner 10 and the FM broadcasting audio signal thus received is emanated from the speakers 4L, 4R as sounds if it is determined by receiving the RDS broadcasting signal with the tuner 10 that any one of broadcasting stations starts broadcasting the previously-registered broadcast contents when sounds are not emanated from the speakers 4L, 4R at all under the condition that the power switch of the system stereo apparatus is in its off state; and (4) Mode (referred to hereinafter as "RDS automatic recording mode") in which the FM broadcasting audio signal of the corresponding broadcasting station is received by the tuner 10 and the FM broadcasting audio signal thus received is recorded on the tape by the tape deck 3 if it is determined by receiving the RDS broadcasting signal with the tuner 10 that any one of broadcasting stations starts broadcasting previously-registered broadcast contents under the condition that any one of audio signal is output or that the power switch of the system stereo apparatus is in its off state.

Regardless of the mode, if it is determined by the RDS data that the broadcasting of the previously-registered broadcast contents is finished, then the original channel selection frequency is restored. Specifically, in the case of the RDS forced channel selection mode, the channel selection frequency of the original broadcasting station is restored after the broadcasting of the previously-registered broadcast contents was finished under the control of the control circuit 21. Also, it is possible to set any of the above-mentioned operation modes by operating any of the keys 22.

In the case of the RDS forced function switching mode, under the control of the control circuit 21, the function switching circuit 25 is operated so that the original reproduced audio signal is output after the broadcasting of the previously-registered broadcast contents was finished. In this case, if the function switching circuit 25 switches the function mode so that audio signal reproduced from the disc or the tape by the CD player 2 or the tape deck 3 is output, under the control of the control circuit 21, the CD player 2 or the tape deck 3 is set in the pause mode when the broadcasting audio signal is started being output in the RDS forced function switching mode. Also, under the control of the control circuit 21, when the original reproduced audio signal is output after the RDS forced function switching mode was finished, the CD player 2 or the tape deck 3 starts reproducing the disc or the tape from the position at which the CD player 2 or the tape deck 3 was set in the pause mode to stop the reproduction of the disc or the tape temporarily.

In the case of the RDS forced power switch on mode, under the control of the control circuit 21, the system stereo apparatus is de-energized so that no sounds are emanated from the speakers 4L, 4R at all after the broadcasting of the previously-registered broadcast contents was finished. It is possible for the listener to set the RDS forced power switch on mode by operating predetermined keys of the keys 22 when the whole of the system stereo apparatus is de-energized.

In the case of the RDS automatic recording mode, under the control of the control circuit 21, the tape deck 3 is deenergized to stop recording the audio signal on the tape after the broadcasting of the previously-registered broadcasting contents was finished. Also, under the control of the control circuit 21, the power switch is turned off when the tape deck 3 is automatically energized to start recording the audio signal on the tape after the tape deck 3 had been in its off state. When the CD player 2 is reproducing a piece of music or the like from the compact disc in the RDS automatic recording mode, even if the RDS broadcasting audio signal of the previously-registered content is recorded on the tape by the tape deck 3, the function switching circuit 25 may be de-energized and the audio signal reproduced from the compact disc by the CD player 2 may be emanated from the speakers 4L, 4R as sounds. When the RDS broadcasting audio signal of the previously-registered broadcasting contents is recorded on the tape by the tape deck 3, under the control of the function control circuit 23, the function switching circuit 25 may be energized to switch the function mode so that demodulated RDS broadcasting audio signal is output from the speakers 4L, 4R as sounds instead of the sounds reproduced from the compact disc by the CD player 2.

In any of the above-mentioned operation modes, when the broadcasting audio signal representing broadcasting contents that were previously registered based on the RDS data is automatically output form the speakers 4L, 4R as sounds, the control circuit 21 judges output volume level that was set at that time, and controls volume level so that sounds of proper volume level may be emanated from the speakers 4L, 4R if it is determined that the level of the volume control is lowered completely or that the volume level is smaller that appropriate volume level.

As an example of the operation states presented when the above-mentioned operation modes are set, the RDS forced power switch on mode will be described with reference to a flowchart of FIG. 4.

Figure 4:
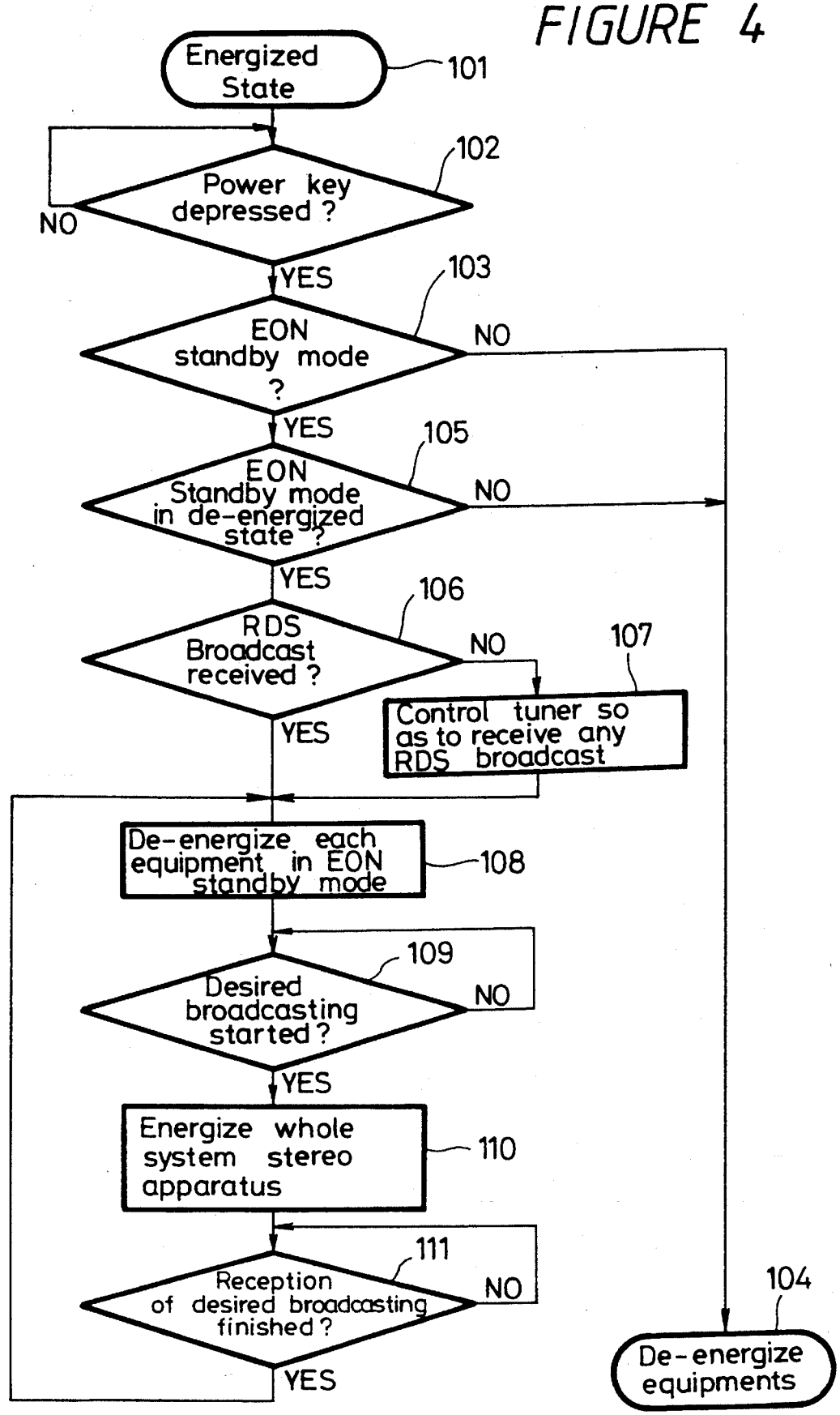
FIG. 4 is a flowchart to which reference will be made in explaining operation of the system stereo apparatus according to the embodiment of the present invention.

As shown in FIG. 4, in step 101, sounds of any equipment are emanated from the left and right speakers 4L, 4R under the condition that respective equipments are energized under the control of the control circuit 21 in the amplifying apparatus 20. It is determined in the next decision 102 by the control circuit 21 whether or not the power key of the keys 22 is depressed to de-energize the system stereo apparatus. If the power key is depressed as represented by a YES at decision step 102, then the processing proceeds to the next decision step 103. It is determined in decision step 103 by the control circuit 21 whether or not any one of the modes in which the broadcasting audio signal of broadcasting content registered based on RDS data is output (or recorded) is set. These modes will be generally referred to hereinafter as "EON standby mode".

If the EON standby mode is not set as represented by a NO at decision step 103, then the processing proceeds to step 104, whereat respective equipments, such as the tuner 10, the amplifying apparatus 20, the CD player 2 and the tape deck 3 are de-energized. In the de-energized state, the supply of power to respective portions of the equipments is substantially completely stopped except circuits that should be constantly energized, such as a clock circuit and a remote control signal sensing circuit (both of which are not shown).

If the EON standby mode is set as represented by a YES at decision step 103, then the processing proceeds to the next decision step 105. It is determined in decision step 105 whether or not the EON standby mode from the de-energized state is set, or whether or not the RDS forced power switch on mode or the RDS automatic recording mode from the de-energized state is set. If the EON standby mode from the de-energized state is not set as represented by a NO at decision step 105, then the processing proceeds to step 104, whereat the respective equipments are de-energized similarly to step 103.

If the EON standby mode from the de-energized state is set as represented by a YES at decision step 105, then the processing proceeds to the next decision step 106. It is determined in decision step 106 whether or not the RDS broadcasting is now received by the tuner 10. If FM broadcasting on which the RDS data is not superimposed is received, or the tuner 10 is de-energized as represented by a NO at decision step 106, then the processing proceeds to step 107. In step 107, control command is supplied to the control circuit 17 of the tuner 10 so that the tuner 10 may receive any RDS broadcasting.

In the next step 108, respective equipments are deenergized in the EON standby mode. At that time, the circuits that are required by the tuner 10 to receive and identify RDS data, i.e., the front end circuit 11 to the data demodulating circuits 16, the PLL circuit 12, the control circuit 17 and the control circuit 21 provided within the amplifying apparatus 20 are energized.

It is determined in the next decision step 109 by the control circuit 17 provided within the tuner 10 whether or not any broadcasting station starts broadcasting of desired classification of broadcasting content based on received RDS data. If the broadcasting station starts broadcasting of the desired broadcasting classification as represented by a YES at decision step 109, then the processing proceeds to the next step 110, whereat the whole of the system stereo apparatus is energized under the control of the control circuit 21 provided within the amplifying apparatus 20. Also, if the function mode is not switched to the tuner 10, then the function mode is switched to the tuner 10 (except when only the RDS broadcasting is recorded on the tape by the tape deck 3). At that time, the control circuit 21 automatically adjusts the volume control such that the level of output volume becomes proper volume level. In the case of the mode in which the RDS broadcasting is recorded on the tape by the tape deck 3, the tape deck 3 is placed in the state corresponding to the operation mode under the control of the control circuit 21.

It is determined in the next decision step 111 by the RDS data thus received whether or not the broadcasting of the desired broadcasting classification, i.e., the broadcasting of the currently received broadcasting classification is finished. If it is determined in decision step 111 based on the RDS code that the broadcasting of the currently received broadcasting classification is finished, then the processing returns to step 108, whereat the power switch of the system stereo apparatus is turned off in the EON standby mode. At that time, if the function mode of the system stereo apparatus were switched by the function switching circuit 25 in the immediately-preceding step 110, the function switching circuit 25 would switch the function mode of the system stereo apparatus to the original function mode under the control of the control circuit 21. Similarly, if the output volume level were changed in the immediately-preceding step 110, the volume control would return volume level to the original volume level under the control of the control circuit 21.

While the control circuit 21 in the amplifying apparatus 20 carries out various control operations, such as operation modes shown in the flowchart of FIG. 4, based on the RDS data received and identified by the tuner 10 as described above, the present invention is not limited thereto and the control circuit 17 in the tuner 10 can control various operations based on these RDS data, i.e., operations in order to execute the RDS forced channel selection mode, the RDS forced function switching mode, the RDS forced power switch on mode and the RDS automatic recording mode. In this case, the control circuit 17 in the tuner 10 identifies demodulated RDS data supplied thereto from the RDS data demodulating circuit 16. If the identified results from the control circuit 17 shows that the previously-set RDS broadcasting was already started, then the control circuit 17 supplies the channel selection control signal to the PLL circuit 12 and also supplies the control signal corresponding to each operation mode to the control circuit 21 of the amplifying apparatus 20. The control signals that are supplied from the control circuit 17 to the control circuit 21 are function switching control signals used to execute operations on the flowchart of FIG. 4, such as the control signal for energizing respective units other than the control circuit 21 of the amplifying apparatus 20 to place the amplifying apparatus 20 in the operable state if the operation mode is the RDS forced power switch on mode.

In the operation mode other than the RDS forced power switch on mode, such as the RDS automatic recording mode, a control signal is supplied to a control unit or controller (not shown) of the tape deck 3 through the control circuit 21 of the amplifying apparatus 20. While in that case the amplifying apparatus 20 is directly supplied with the control signal from the control circuit 17 of the tuner 10 as described above, the control circuit or controller of the CD player 2 or the tape deck 3 is supplied with the control signal through the control circuit 21 of the amplifying apparatus 20. In this case, it is possible to supply the control signal from the control circuit 17 to the control circuits or controllers of the CD player 2 and the tape deck 3 by directly connecting the CD player 2 and the tape deck 3 to the tuner 10.

Further, in this case, the tuner 10 includes operation input units used to set the aforementioned operation modes (1) to (4) to thereby set and input the modes and the desired RDS broadcasting set by the operation input units to the control circuit 17. It is needless to say that the amplifying apparatus 20 of this case is an amplifying apparatus having functions corresponding to the aforementioned operation modes (1) to (4).

Furthermore, at least one of the tuner 10 and the amplifying apparatus 20 may include a display unit composed of an LCD (liquid crystal display) or the like to display data based on RDS data demodulated by the RDS data demodulating circuit 16 of the tuner 10. Because RDS data contain data representing genre of a piece of music and character data representing broadcasting station name, the above-mentioned display unit may display thereon these data based on the demodulated RDS data output thereto from the RDS data demodulating circuit 16 under the control of the control circuit 17 or 21.

As described above, it is possible for the listener to receive and listen to or to automatically record on the tape the broadcasting of only the desired broadcasting classification, such as traffic information, news and a piece of music in each genre from the state that the system stereo apparatus is in its off state. Therefore, the FM broadcasting on which the RDS data were superimposed need not be continuously received and the listener need not listen to such received FM broadcasting, i.e., the listener need not listen to useless broadcasting. Thus, the system stereo apparatus according to this embodiment becomes easier to handle when used as a radio receiver.

If output volume is not at the proper volume level when the RDS broadcasting is automatically received under the condition that the system stereo apparatus is in its off state, then the output volume can be set to the proper volume level automatically as described above. Thus, even when the power switch of the system stereo apparatus is turned off under the condition that the level of the volume control is completely lowered, it is possible to prevent the listener from missing the chance of listening to necessary broadcasting program.

From the state that the system stereo apparatus is in its off state, the RDS broadcasting can automatically be received and the received audio signal can be recorded on the tape by the tape deck 3. As a result, it becomes possible to automatically record only a piece of broadcast music of a certain genre. Thus, it becomes possible to record only the necessary contents of the broadcasting efficiently.

When the RDS broadcasting is automatically received under the condition that the system stereo apparatus is in its off state, if the function mode is set to other function mode than the tuner mode, the function mode can be automatically switched to the tuner mode. Also, after the reception of the RDS broadcasting is finished, the current tuner mode is switched to the original function mode so that it is not necessary for the listener to switch the function mode. Therefore, the system stereo apparatus according to this embodiment becomes easier to handle.

While the present invention is applied to the RDS broadcasting which is now commercially available in the FM broadcasting as described above, the present invention is not limited to the radio broadcasting such as the FM broadcasting or the like and may of course be applied to similar broadcasting services in future television broadcasting, if realized.

Furthermore, while the present invention is applied to the system stereo apparatus, the present invention is not limited thereto and may of course be applied to reception apparatus of a variety of other types, such as a portable cassette player with radio receiver, a car stereo or the like.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A signal reproducing apparatus comprising:

demodulating means for demodulating a received broadcasting signal that was modulated with a baseband signal and a data signal to obtain the baseband signal and the data signal, the baseband signal having a program content, the data signal identifying the program content of the baseband signal;

amplifying means for amplifying the baseband signal to form an amplified baseband signal, the amplified baseband signal being capable of driving an external speaker;

identifying means for identifying the program content in the data signal; and control means for energizing the demodulating means, and the identifying means, and for deenergizing the amplifying means when a power switch of said signal reproducing apparatus is turned off and a predetermined receiving mode is set, and for reenergizing the amplifying means when the program content in the data signal indicates that a preselected program is present.

2. The signal reproducing apparatus according to claim 1, and further comprising:

signal source means for outputting an alternate baseband signal; and switching means for selecting either the baseband signal or the alternate baseband signal, wherein the switching means selects the baseband signal or the alternate baseband signal in response to a control signal from the control means.

3. The signal reproducing apparatus according to claim 2, wherein the control means switches the switching means such that the baseband signal is supplied to the amplifying means instead of the alternate baseband signal when the identifying means determines from the program content of the data signal that the preselected program is present.

4. The signal reproducing apparatus according to claim 2, wherein the control means switches the switching means such that the baseband signal is supplied to the amplifying means instead of the alternate baseband signal, and deenergizes the signal source means to temporarily stop outputting the alternate baseband signal when the identifying means determines from the program content of the data signal that the preselected program is present, and wherein the control means switches the switching means such that the alternate baseband signal is supplied to the amplifying means, and reenergizes the signal source means to again output the alternate baseband signal when the identifying means determines from the program content of the data signal that the preselected program is finished.

5. The signal reproducing means according to claim 2, wherein the control means generates a channel selection control signal to the demodulating means so that the demodulating means demodulates a different broadcast signal to obtain a different baseband signal when the identifying means determines from the program content of the data signal that a predetermined program is present on the different broadcast signal, and switches the switching means such that the different baseband signal is output by the switching means.

6. The signal reproducing apparatus according to claim 2, and further comprising recording and/or reproducing means for recording and/or reproducing an output signal supplied thereto from the switching means.

7. A reception apparatus comprising:

receiving means for forming an intermediate frequency signal in response to a broadcasting signal that was modulated with a baseband signal and a data signal, the baseband signal having a program content, the data signal identifying the program content of the baseband signal;

demodulating means for demodulating the intermediate frequency signal to form the baseband signal and the data signal;

data extraction means for extracting program content data from the data signal; and control means for controlling the receiving means, the demodulating means, and the data extraction means, wherein the receiving means, the demodulating means, the data extraction means, and the control means are energized when said reception apparatus is deenergized and a predetermined receiving mode is set, and wherein said reception apparatus is reenergized to output an amplified baseband signal capable of driving a speaker, and the control means directs the receiving means to receive a different broadcast signal when the program content data indicates that a preselected program is modulated onto the different broadcast signal.

8. A method of controlling a signal reproducing apparatus having a demodulating means, an identifying means, and an amplifying means, the demodulating means demodulating a broadcast signal that was modulated with a baseband signal and a data signal to obtain the baseband signal and the data signal, wherein the baseband signal has a program content and the data signal identifies the program content of the baseband signal, the identifying means identifying the program content in the data signal, the amplifying means amplifying the baseband signal to provide an amplified baseband signal capable of driving an external speaker, the method comprising the steps of:

energizing the demodulating means and the identifying means when said signal reproducing apparatus is de-energized and a predetermined receiving mode is set; and energizing said signal reproducing apparatus such that the amplifying means outputs the amplified baseband signal, and directing the demodulating means to demodulate a different broadcast signal when the identifying means determines from the program content of the data signal that the preselected program is present on the different broadcast signal.

9. The method of claim 8, wherein the baseband signal output from the demodulating means is supplied to the amplifying means instead of an output signal from another signal source when the identifying means determines from the program content of the data signal that the preselected program is present on the different broadcast signal.

10. The method of claim 8, wherein the demodulating means demodulates a different broadcast signal to obtain a different baseband signal when the identifying means determines from the program content of the data signal that a predetermined program is present on the different broadcast signal.

* * * * *